(12) United States Patent
McIntosh

(10) Patent No.: US 11,446,628 B2
(45) Date of Patent: Sep. 20, 2022

(54) ROBOTIC COSMETIC MIX BAR

(71) Applicant: Yateou, Inc., Newark, CA (US)

(72) Inventor: Adedayo Oyetola McIntosh, Newark, CA (US)

(73) Assignee: YATEOU, INC., Newark, CA (US)

( * ) Notice: Subject to any disclaimer, the term of this patent is extended or adjusted under 35 U.S.C. 154(b) by 739 days.

(21) Appl. No.: 16/273,524

(22) Filed: Feb. 12, 2019

(65) Prior Publication Data

US 2019/0291069 A1 Sep. 26, 2019

Related U.S. Application Data

(60) Provisional application No. 62/648,117, filed on Mar. 26, 2018.

(51) Int. Cl.
| | |
|---|---|
| *B22C 5/00* | (2006.01) |
| *B01J 19/00* | (2006.01) |
| *G06Q 30/06* | (2012.01) |
| *B01F 23/70* | (2022.01) |
| *B01F 23/80* | (2022.01) |

(Continued)

(52) U.S. Cl.
CPC ......... *B01J 19/0013* (2013.01); *B01F 23/702* (2022.01); *B01F 23/711* (2022.01); *B01F 23/802* (2022.01); *B01F 33/8442* (2022.01); *B01F 35/145* (2022.01); *B01F 35/2209* (2022.01); *B01F 35/2215* (2022.01); *B01F 35/71735* (2022.01); *G06Q 30/0601* (2013.01);

(Continued)

(58) Field of Classification Search
CPC .............................. B67D 1/0041; G06Q 50/12
See application file for complete search history.

(56) References Cited

U.S. PATENT DOCUMENTS

| 3,409,176 A | 11/1968 | Krause |
| 3,675,820 A | 7/1972 | Newberry et al. |

(Continued)

FOREIGN PATENT DOCUMENTS

| DE | 19627360 A1 * | 1/1998 | ............... B25J 11/00 |
| WO | WO-2006052863 A1 * | 5/2006 | ............ A45D 44/005 |

OTHER PUBLICATIONS

Machine translation of the description of DE-19627360-A1 (Year: 1998).*
Between Human & Machine https://www.makrshakr.com, (4 pages).

*Primary Examiner* — Anshu Bhatia
*Assistant Examiner* — Gregory Y Huan
(74) *Attorney, Agent, or Firm* — Perkins Coie LLP

(57) ABSTRACT

Improving health and experience of a cosmetic product user, the robotic cosmetic mix bar of the present invention is disclosed. The robotic cosmetic mix bar allows the user to select safe ingredients tailored to their own unique hair and skincare goals. In one embodiment, the robotic cosmetic mix bar contains a robotic arm surrounded by a dispenser and multiple processing stations. Based on a user input indicating a type of cosmetic product and the ingredients to include in the cosmetic product, the robotic arm obtains the desired ingredients from the dispenser and, by transporting the ingredients from one processing station to another, the robotic arm facilitates the processing of the ingredients. The processing of ingredients can include boiling, cooling, mixing, whisking, blending, etc. Within approximately two minutes, the cosmetic product built according to the user specifications is delivered to the user.

22 Claims, 10 Drawing Sheets

(51) Int. Cl.
  *B01F 33/84* (2022.01)
  *B01F 35/10* (2022.01)
  *B01F 35/22* (2022.01)
  *B01F 35/221* (2022.01)
  *B01F 35/71* (2022.01)
  *B01F 33/80* (2022.01)
  *B01F 101/21* (2022.01)

(52) U.S. Cl.
  CPC ......... *B01F 33/836* (2022.01); *B01F 2101/21* (2022.01); *B01J 2219/00691* (2013.01)

(56) References Cited

U.S. PATENT DOCUMENTS

| | | | |
|---|---|---|---|
| 3,991,911 | A | 11/1976 | Shannon et al. |
| 9,827,678 | B1* | 11/2017 | Gilbertson ............. B25J 18/025 |
| 2004/0017728 | A1* | 1/2004 | Becker ............... G01N 35/0099 |
| | | | 366/605 |
| 2016/0059412 | A1* | 3/2016 | Oleynik ................... B25J 19/02 |
| | | | 700/257 |
| 2017/0016926 | A1* | 1/2017 | Aouad ................... B01F 33/846 |
| 2017/0334062 | A1* | 11/2017 | Allen ................... B25J 11/0005 |

* cited by examiner

FIG. 2B

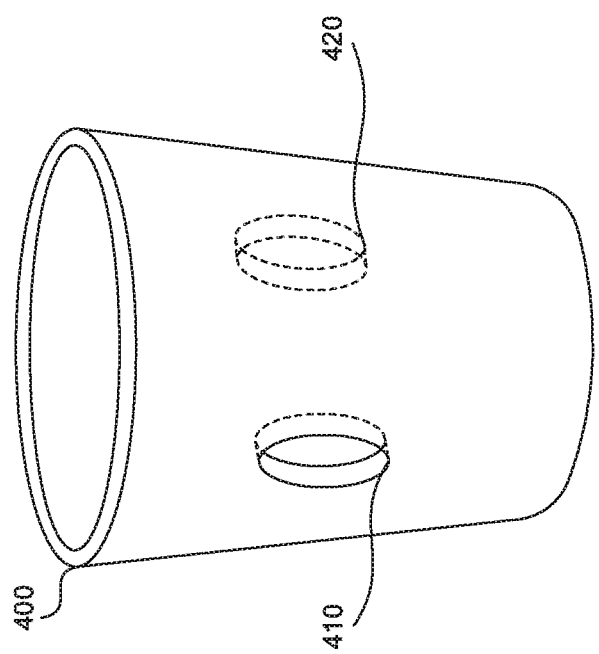

ROBOTIC COSMETIC MIX BAR

CROSS-REFERENCE TO RELATED APPLICATIONS

This application claims priority to the U.S. Provisional Patent Application Ser. No. 62/648,117 filed Mar. 26, 2018, which is incorporated herein by reference in its entirety.

TECHNICAL FIELD

The present application is related to creating a cosmetic product, and more specifically to methods and systems that utilize robots to create the cosmetic product.

BACKGROUND

The average woman uses 12 cosmetic products daily, containing 168 different ingredients. For women of color it's at least 20 percent more. Sixty percent of the ingredients contained in cosmetic products can act like estrogen or can disrupt hormones. Forty-five percent of the ingredients can be harmful to the woman's reproductive system or, for pregnant women, the ingredients can be harmful to baby's development. Thirty-three percent of the ingredients are linked to cancer.

SUMMARY

Improving health and experience of a cosmetic product user, the robotic cosmetic mix bar of the present invention is disclosed. The robotic cosmetic mix bar allows the user to select safe ingredients tailored to their own unique skin and hair goals. In one embodiment, the robotic cosmetic mix bar contains a robotic arm surrounded by a dispenser and multiple processing stations. Based on a user input indicating a type of cosmetic product and the ingredients to include in the cosmetic product, the robotic arm obtains the desired ingredients from the dispenser and, by transporting the ingredients from one processing station to another, the robotic arm facilitates the processing of the ingredients. The processing of ingredients can include boiling, cooling, mixing, whisking, blending, etc. Within a minimum of approximately two minutes, the cosmetic product built according to the user specifications is delivered to the user.

BRIEF DESCRIPTION OF THE DRAWINGS

These and other objects, features and characteristics of the present embodiments will become more apparent to those skilled in the art from a study of the following detailed description in conjunction with the appended claims and drawings, all of which form a part of this specification. While the accompanying drawings include illustrations of various embodiments, the drawings are not intended to limit the claimed subject matter.

FIGS. 2A-2B show the user interface to receive a user input regarding a cosmetic product.

FIG. 4 shows a container manipulated by the robotic arm in FIG. 3.

DETAILED DESCRIPTION

Terminology

Figure 1:
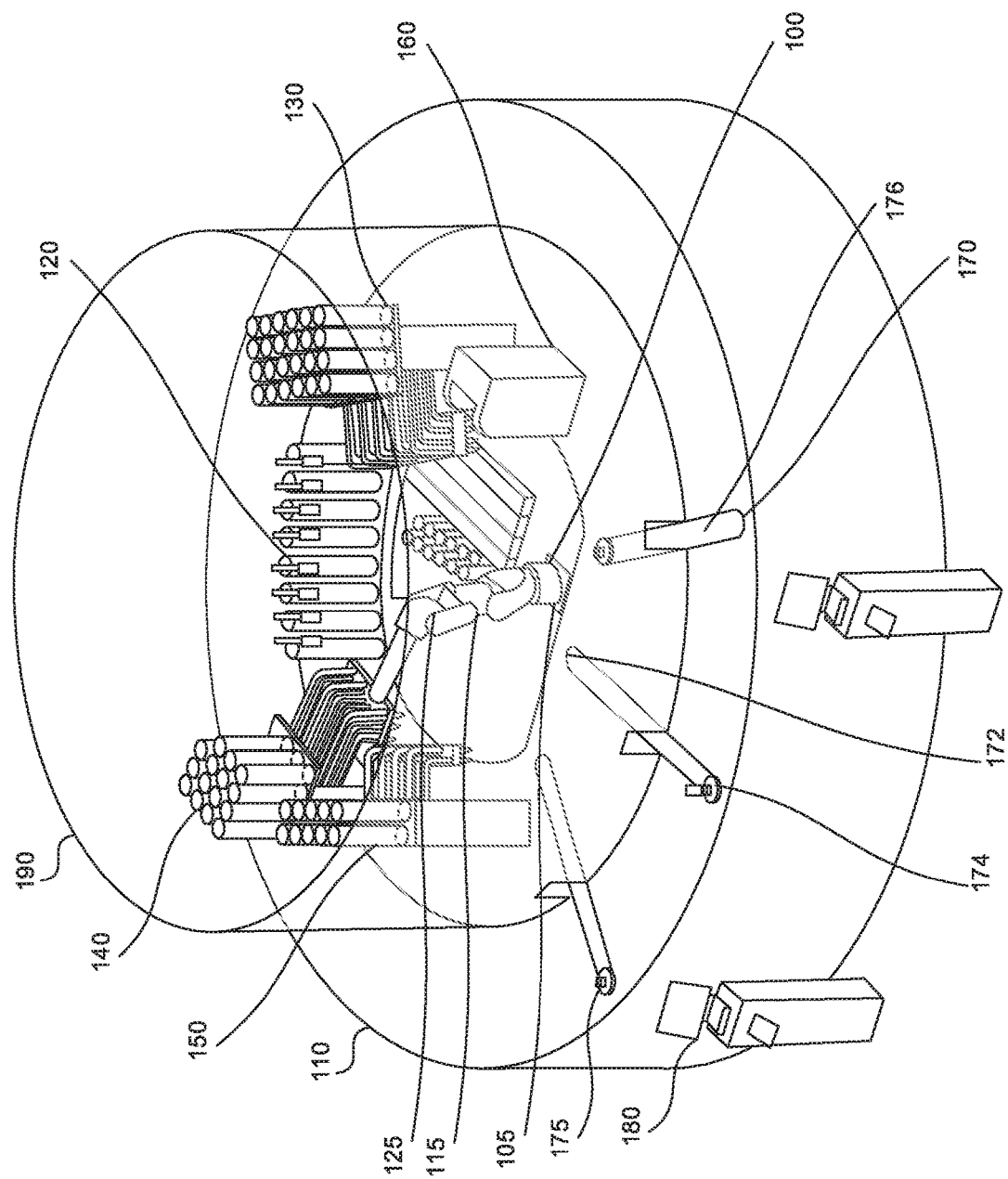
FIG. 1 shows a system acting as a robotic cosmetic mix bar to create a custom cosmetic product, according to one embodiment.

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example, using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Robotic Cosmetic Mix Bar

Improving health and experience of a personal care product user, the robotic cosmetic mix bar of present invention is disclosed. The robotic cosmetic mix bar allows the user to select safe ingredients matching their own unique skin or hair type. In one embodiment, the robotic cosmetic mix bar can contain a robotic arm surrounded by a dispenser and multiple processing stations. Based on a user input indicating a type of personal care product and the ingredients to include in the personal care product, the robotic arm can obtain the desired ingredients from the dispenser and, by transporting the ingredients from one processing station to another, the robotic arm can facilitate the processing of the ingredients. The processing of ingredients can include boiling, cooling, mixing, whisking, blending, etc. Within approximately two minutes, the personal care product built according to the user specifications can be delivered to the user. The personal care products can include a skin product, a hair product, a nail product, such as makeup, lotion, body butter, scrub, sunscreen, nail polish, makeup remover, nail polish remover, etc.

FIG. 1 shows a system acting as a robotic cosmetic mix bar to create a custom personal care product, according to one embodiment. The system can include an automatically-operated member 100 positioned at approximately a center of a hollow cylindrical table 110, a dispenser 120, various processing stations 130, 140, 150, 160, one or more delivery stations 170 (only one labeled for brevity), and a device 180 to receive user input. The automatically-operated member 100 can be a robot, such as a robotic arm, as shown in FIG. 1. In addition, the automatically-operated member 100 can be a Roomba, a Selective Compliance Assembly Robot Arm or Selective Compliance Articulated Robot Arm, i.e., SCARA robot, etc.

The dispenser 120 and various processing stations 130, 140, 150, 160 can be arranged in a substantially circular layout around the robotic arm 100. Due to the circular layout, the robotic arm 100 can reach the dispenser 120, the various processing stations 130, 140, 150, 160 and the one or more delivery stations 170 by rotating around various joints 105, 115, 125, without requiring any of the joints 105, 115, 125 to translate to reach the dispenser 120, the various processing stations 130, 140, 150, 160 and/or the delivery station 170. In some embodiments, the joints 105, 115, 125 can translate to reach.

In another embodiment, the dispenser 120 and the various processing stations 130, 140, 150, 160 can be arranged in a noncircular pattern, such as an elliptical pattern, a rectangular pattern a linear pattern, etc. around the robotic arm 100. The two or more of the various processing stations 130, 140, 150, 160 can be stacked on top of each other, so that the robotic arm 100 need only move up or down to access the stacked processing stations.

The device 180 can be a touch-enabled display screen, such as a tablet as shown in FIG. 1. The device 180 can be affixed to the hollow cylindrical table 110, and the device 180 can be user's own mobile device, such as a cell phone. When the device 180 is user's mobile device, the device 180 can communicate through wired or wireless means with a processor associated with the system to indicate user's preferences, such as ingredients to be included in the personal care product.

The dispenser 120 can dispense the ingredients specified by the user, while processing stations 130, 140, 150, 160 can facilitate the mixing and creation of the personal care product. One of the processing stations 130, 140, 150, 160 can be a sealing station. The sealing station can be a penultimate station before the one or more delivery stations 170. The sealing station can close the container 175, so that the processed ingredients do not spill out of the container 175. The sealing station can provide a top, such as a cork, a screw-on bottle top, etc., to close the container 175.

The one or more delivery stations 170 can receive a container 175 containing the personal care product at a first end 172 of the delivery station 170. The delivery station 170 can transport the container 175 to a second end 174 of the delivery station 170, where the user can pick up the container 175. The first end 172 and the second end 174 can be separated by a barrier 190, which can protect the robotic arm 100 from interference by the user. The barrier 190 can be transparent. The first end 172 and the second end 174 can be connected by a conveyor belt 176 that when activated can transport the container 175 between the first end 172 and the second end 174. The container 175 can have a magnetic bottom that can be magnetically attracted to the conveyor belt 176, thus keeping the container 175 stable during transport. The conveyor belt 126 can be electronic and/or can be activated by a spring mechanism.

Figure 2A:
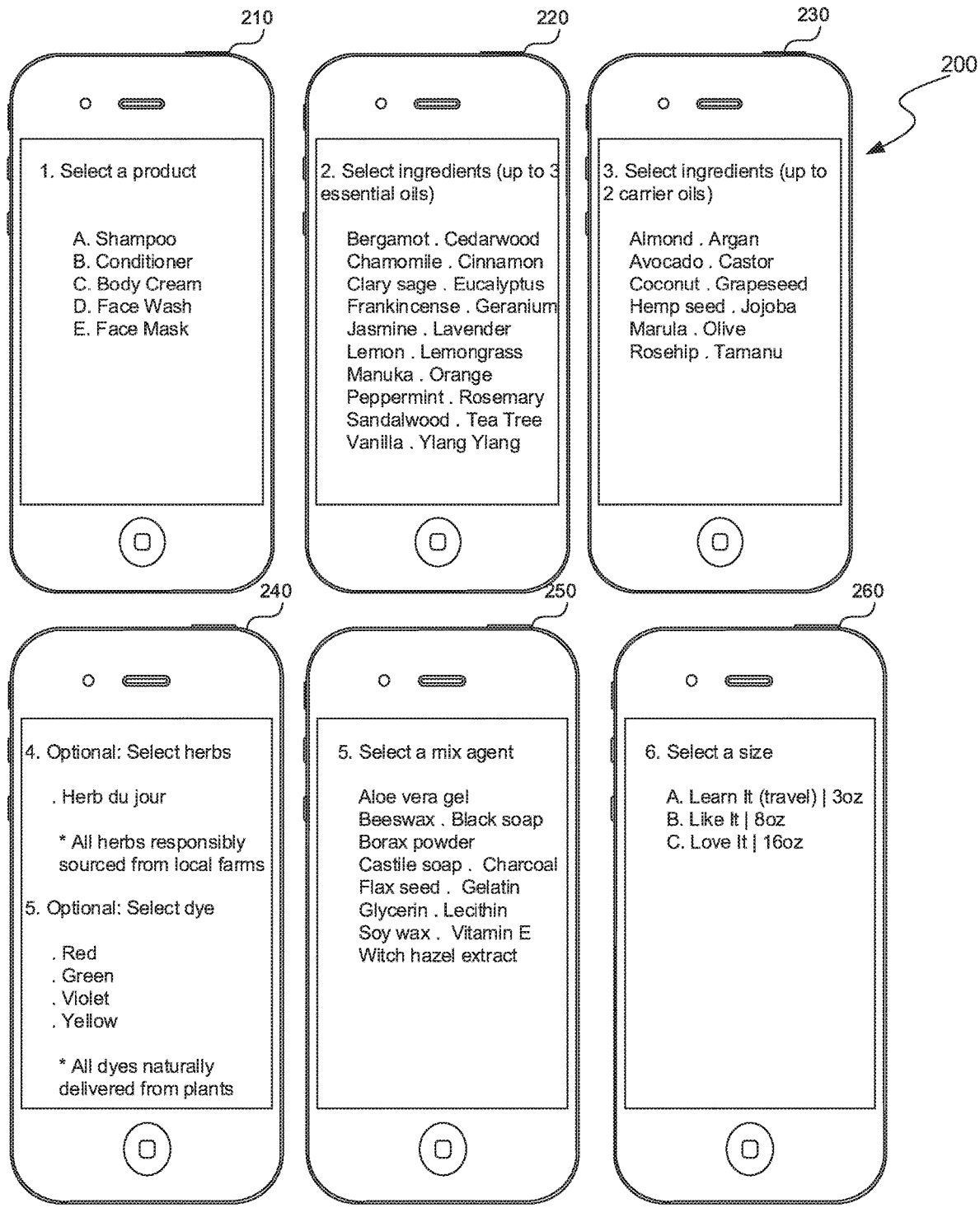
Figure 2B:
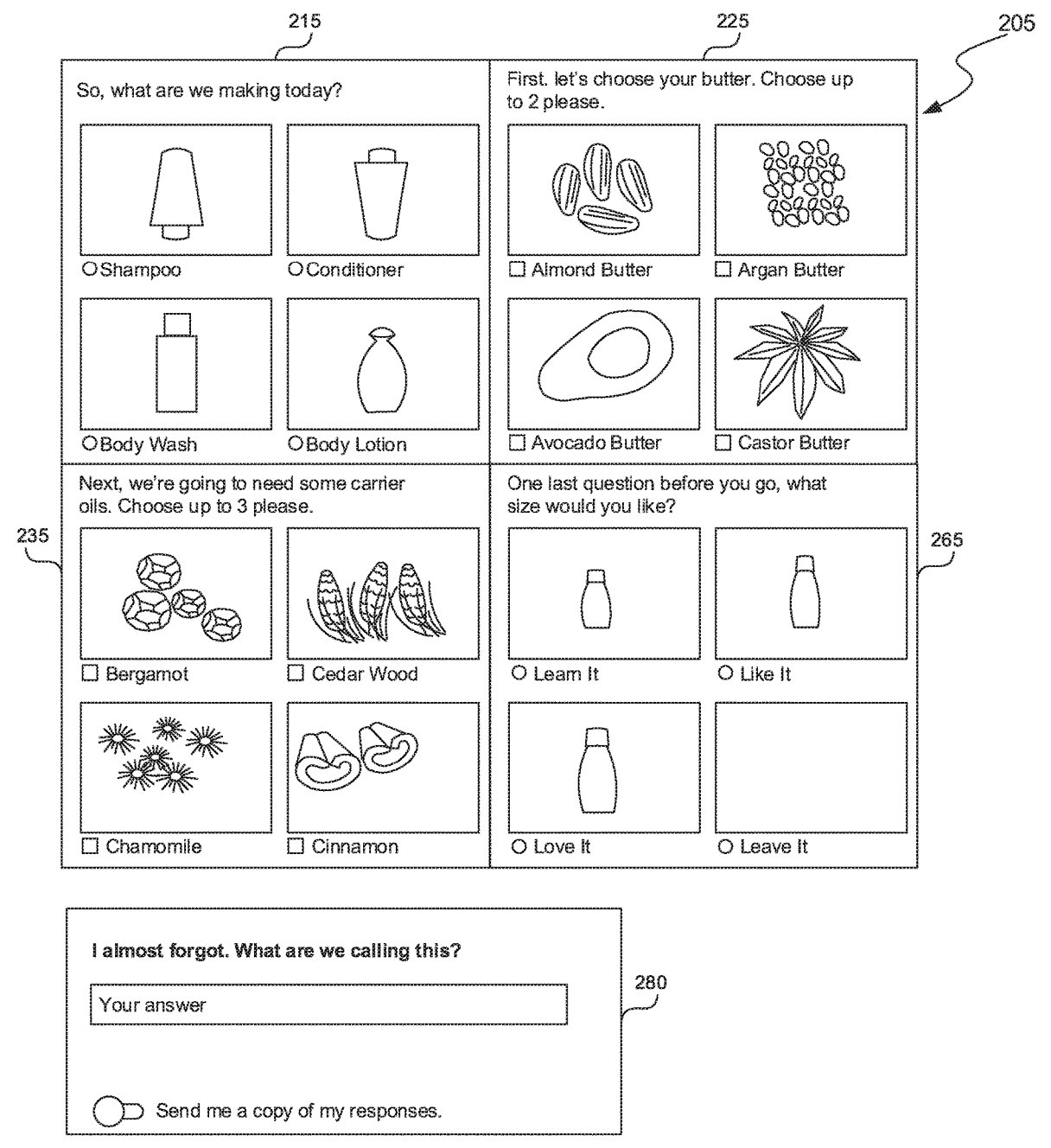

FIGS. 2A-2B show the user interface to receive a user input regarding a personal care product. The user interface 200, 205 can provide step-by-step questions to the user to receive the user input regarding the personal care product. The user interface 200, 205 provides the user with the ability to create a custom personal care product and specify ingredients that go into the custom personal care product.

In step 210, 215, the user interface 200, 205 can query the user for a product, such as a hair care product, body wash, face wash, a facemask, body butter, body lotion, scrub, shaving cream, etc. Different ingredients can go into different products, so the query in the subsequent step 220, 225 can depend upon the user's product selection in step 210, 215. For example, body butter can include different types of butters as seen in step 215, while a hair care product and/or body wash can include butters as well as oils.

In step 220, 225 the user interface 200, 205 can query the user for an essential oil, or a butter, depending on the user's product selection. A list of available butters and essential oils can be presented to the user. The user interface 200, 205 can specify a maximum number of ingredients, such as three ingredients.

In step 230, 235, the user interface 200, 205 can query the user for a carrier oil and can specify a maximum number of ingredients, such as two ingredients. A list of available oils can be presented to the user. In step 260, 265, the user interface 200, 205 can query the user about a size of the product.

In one embodiment, in step 240, the user interface 200, 205 can query the user for an herb, and/or a dye. In step 250, the user interface 200, 205 can query the user for a mix agent, and/or can present a list of mix agents. Finally, in step 280, the user interface 200, 205 can query the user for a name of the newly created personal care product.

Figure 3:
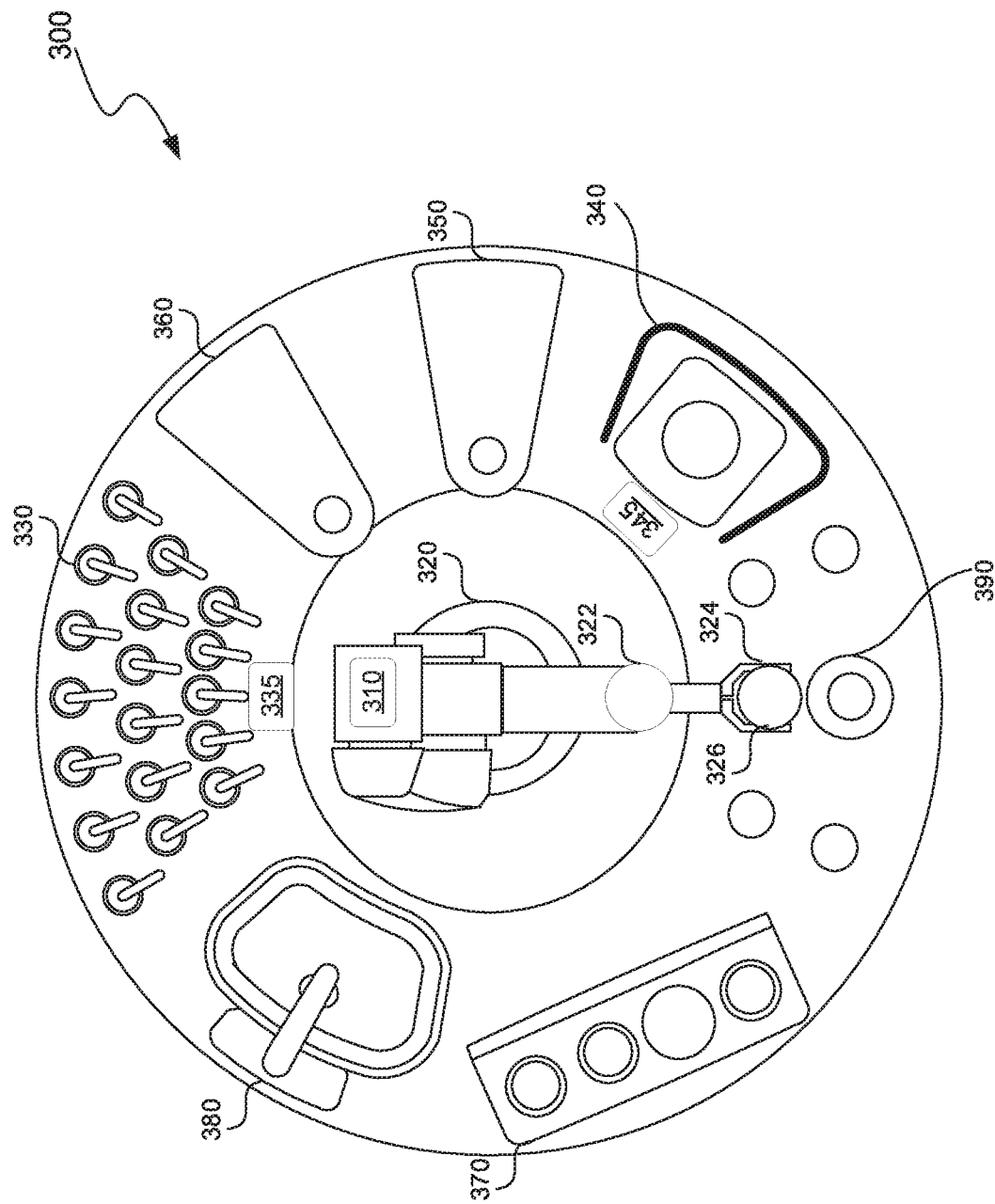
FIG. 3 shows a system acting as a robotic cosmetic mix bar to create a custom cosmetic product, according to another embodiment.

FIG. 3 shows a system acting as a robotic cosmetic mix bar to create a custom personal care product, according to another embodiment. The system 300 can include a computer processor 310, and automatically-operated member 320, one or more dispensers 330, one or more processing stations 340, 350, 360, 370, 380, and a delivery station 390. The automatically-operated member 320 can be a robot, such as a robotic arm, as shown in FIG. 3. In addition, the automatically-operated member 320 can be a Roomba, a SCARA robot, etc.

The dispenser 330, the processing station 340, 350, 360, 370, 380 and the delivery station 390 can be arranged in a substantially circular path around the robotic arm 320, so that the robotic arm 320 can reach the various processing stations 340, 350, 360, 370, 380 without having to translate any of the joints of the robotic arm 320.

The computer processor 310 can receive a user input indicating the custom personal care product and the one or more ingredients associated with the desired product, as described in FIGS. 2A-2B. The computer processor 310 can translate the user input into multiple actions to be performed by the robotic arm 320 and the processing stations 340, 350, 360, 370, 380. Dispenser 330 can dispense the one or more ingredients, such as butters, essential oils, carrier oils, mixing agents, etc., specified by the user.

The computer processor 310, depending on the desired product such as shampoo, body butter, shaving cream, etc., can select a predetermined scenario from multiple predetermined scenarios to be performed by the robotic arm, the dispenser, and the processing station, as described further in this application. The predetermined scenarios can be modified by the user input, such as by selection of the product and by the selection and number of ingredients.

The robotic arm 320 can include a joint 322 and a gripping member 324 rotatably coupled to the joint 322. The gripping member 324 can rotate around all three axes X, Y, Z, about the joint 322. The gripping member 324 can hold a container 326 and can position the container 326 to receive the one or more ingredients from the dispenser 330.

The dispensers 330 can be arranged in a single row as shown in FIG. 1, or they can be arranged in multiple rows as shown in FIG. 3. When dispensers are arranged in multiple rows, the dispensers can have varying heights, so that access to each dispenser is not obstructed by the dispensers in front. Each dispenser 330 can dispense one ingredient, or the dispenser 330 can dispense several ingredients. Each dispenser 330 can receive the ingredient and the amount to dispense and can precisely dispense the required amount.

The robotic arm 320 can deliver the one or more ingredients to a processing station 340, 350, 360, 370, 380. The processing station 340, 350, 360, 370, 380 can be positioned at a predetermined location stored in a memory associated with the robotic arm 320. When robotic arm 320 receives an instruction to go to a processing station 340, the robotic arm can go to the location associated with the processing station 340 stored in the memory. When delivering the one or more ingredients, the robotic arm 320 can deliver the whole container 326, or the robotic arm can rotate the gripping member 324 to pour the contents of the container 326 into the processing station 340, 350, 360, 370, 380, as described further in this application.

The processing station 340, 350, 360, 370, 380, upon receiving the one or more ingredients, can process the one or more ingredients. The processing station can be a temperature control station such as a boiling station 340 that can warm the one or more ingredients to catalyze or to cause a reaction or mixing of the ingredients to occur. The boiling station 340 can be a double boiler. Similarly, the processing station can be a temperature control station such as a refrigerator 370 to cool the one or more ingredients. The processing station can be a mixing station 350 and can mix the one or more ingredients. The processing station can be a whisking station 360 to whisk the one or more ingredients.

The robotic arm 320 can retrieve the processed ingredients from the processing station 340, 350, 360, 370 and can deliver the processed ingredients to a delivery station 390. To retrieve the processed ingredients, the robotic arm 320 can scoop the processed ingredients out of the processing station 340, 350, 360, 370, or the robotic arm 320 can retrieve the container 326 containing the processed ingredients.

The processing station can be a cleaning station 380 to clean the container 326 of the one or more ingredients, so that the container 326 can be reused for another custom personal care product. For example, once the robotic arm 320 has delivered the processed ingredients to the delivery station 390, the robotic arm 320 can take the container 326 to the cleaning station 380.

The processing station 340, 350, 360, 370, 380 can include a sensor 345 (only one labeled for brevity) to detect a proximity of the robotic arm 320. Upon detecting the proximity of the robotic arm 320, the processing station 340, 350, 360, 370, 380 can process the one or more ingredients. For example, the sensor can detect that the robotic arm 320 is close to the processing station 340 for a predetermined amount of time, such as five seconds. The predetermined amount of time prevents the processing station 340 from activating when the robotic arm 320 is only passing by the processing station 340.

Similarly, the dispenser 330 can include a sensor 335 (only one drawn for brevity) to detect a proximity of the robotic arm, and upon detecting the proximity of the robotic arm to dispense the one or more ingredients. The sensor 335 can also activate the dispenser 330 after a predetermined amount of time has passed and the robotic arm 320 has not moved. The predetermined amount of time can be 10 seconds. The multiple dispensers 330 can each have a sensor to detect the presence of the robotic arm 320, so that each dispenser among multiple dispensers 330 can be activated individually.

FIG. 4 shows a container manipulated by the robotic arm 320 in FIG. 3. The container 400 can include a grip slot 410, 420 enabling the gripping member 324 in FIG. 3 of the robotic arm 320 in FIG. 3 to hold the container 400. The grip slot 410, 420 can be indented as shown in FIG. 4, or can have protrusions (not shown) that fit into indentations of the gripping member 324. The grip slot 410, 420 can be flush with the surface of the container 400, and can have magnets located in the grip slot locations that can attach to a magnet in the gripping member 324. The grip slot 410, 420 can also be magnetized when indented or when protruded.

Figure 5A:
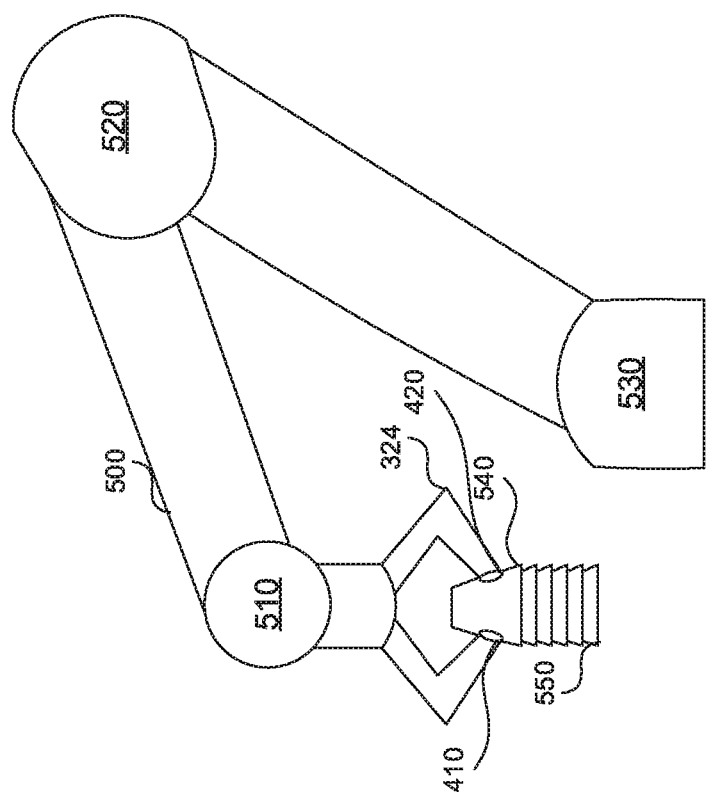
FIGS. 5A-5B show an automatically-operated member.
Figure 5B:
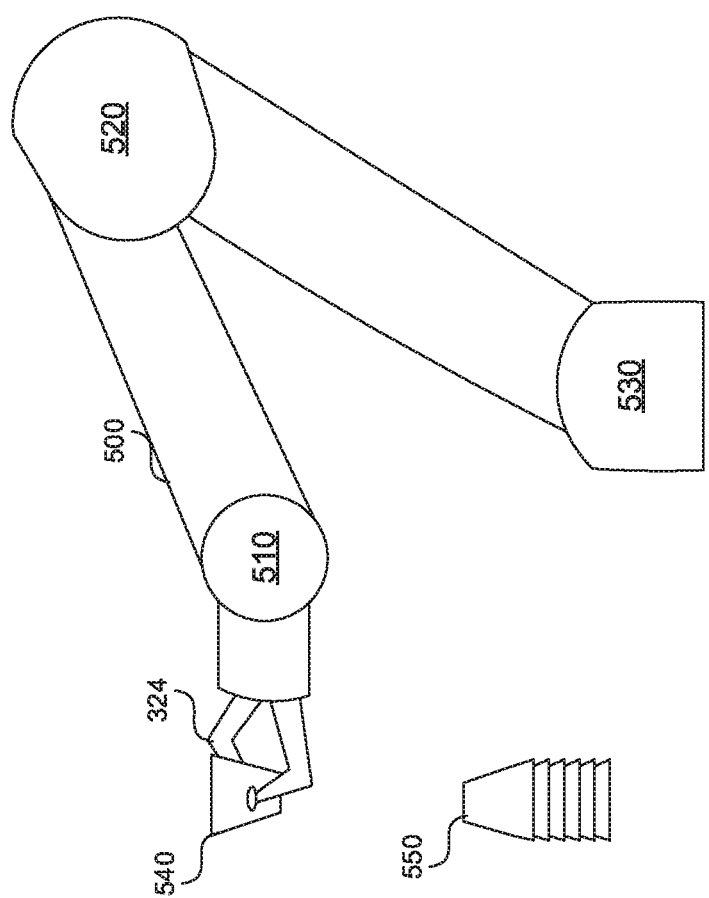

FIGS. 5A-5B show an automatically-operated member. The automatically-operated member 500 can include multiple joints 510, 520, 530. The automatically-operated member 500 can be a robot, such as a robotic arm, as shown in FIGS. 5A-5B. In addition, the automatically-operated member 500 can be a Roomba, a Selective Compliance Assembly Robot Arm or Selective Compliance Articulated Robot Arm, i.e., a SCARA robot, etc. A first joint 510 can be rotatably coupled to the gripping member 324 into the second joint 520, which in turn can be rotatably coupled to a third joint 530. The third joint 530 can rotate the second joint 520, the first joint 510 and the gripping member 324 between the dispenser 330 in FIG. 3, the processing station 340, 350, 360, 370, 380 in FIG. 3 and the delivery station 390 in FIG. 3. The second joint 520 can rotate the first joint 510 and the gripping member 324.

The gripping member 324 can grip a container 540 arranged in a stack 550 of delivery containers and disposed at the delivery station 390. The gripping member 224 can flip the container 540 as shown in FIGS. 5A-5B and can pour the contents of the container 326 in FIG. 3 into the container 540. The robotic arm can then deliver the container 540 containing the custom personal care product to the user.

The container 540 can have grip slots 410, 420. The container 540 may not have the grip slots 410, 420, relying instead on the grip of the gripping member 324 to hold the container 540. The container 540 can be obtained from the stack 550 of delivery containers. The stack 550 can be upside down as shown in FIGS. 5A-5B, in which case, the stack 550 can be spring-loaded to move up as the container 540 is removed from the stack 550. The stack 550 can be right side up (not shown) and can drop down upon the removal of the container 540.

Figure 6:
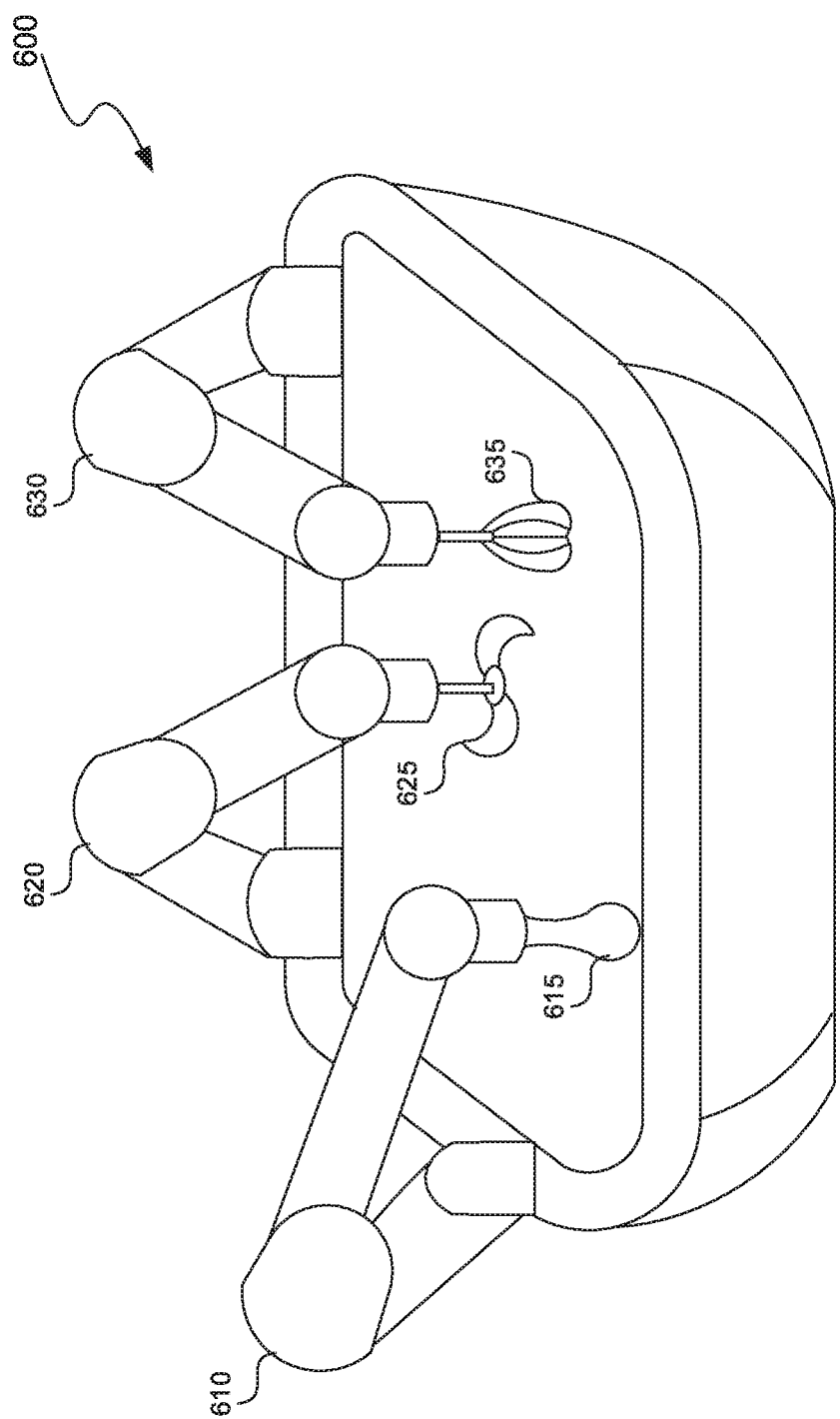
FIG. 6 shows a multipurpose processing station.

FIG. 6 shows a multipurpose processing station. The multipurpose processing station 600 can include multiple switchable members, where a mixing member among the multiple switchable members can blend, whisk, stir, mix, boil, etc. the ingredients. In one embodiment, the switchable member can be an automatically-operated member 610, 620, 630 as shown in FIG. 6 with a different utensil 615, 625, 635 attached to the end of it. In another embodiment, the switchable member can be attached to a single automatically-operated member that can have a different utensil 615, 625, 635 attached to it. The automatically-operated member 610, 620, 630 can be a robot, such as a robotic arm, as shown in FIG. 6. In addition, the automatically-operated member 610, 620, 630 can be a Roomba, a SCARA robot, etc.

Once a multipurpose processing station 600 receives an instruction to perform a desired action, the multipurpose processing station 600 can activate the appropriate switchable member 615, 625, 635 and perform the desired action. For example, when the switchable member is robotic arm 610, 620, 630, the appropriate robotic arm can be activated. In another example, when the switchable member is a utensil 615, 625, 635 attached to a single robotic arm, the robotic arm can receive the appropriate utensil and perform the action. In a third example, if the instruction specifies to boil, a heater associated with the multipurpose processing station 600 can be activated.

Figure 7:
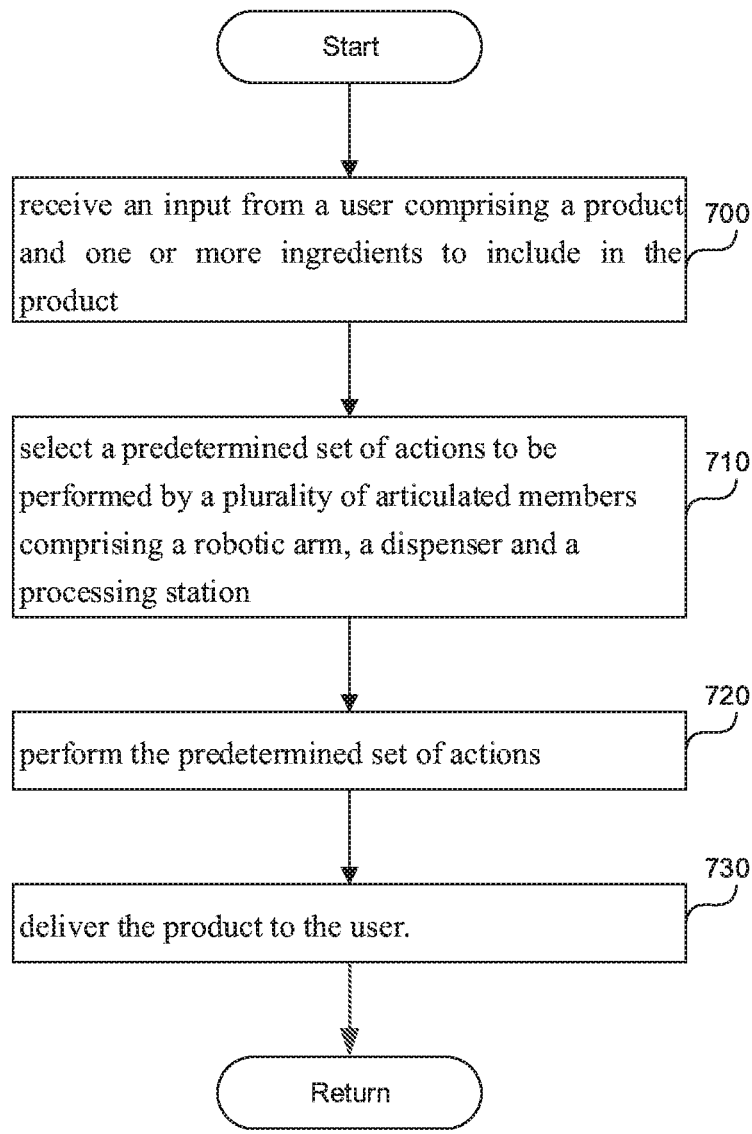
FIG. 7 is a flowchart of a method to create a custom cosmetic product.

FIG. 7 is a flowchart of a method to create a custom personal care product. In step 700, a processor can receive an input from a user indicating a product, one or more ingredients to include in the product, size of the product, and/or a name of the product. The product can be a shampoo, body wash, body butter, shaving cream, facemask, scrub conditioner, body lotion, etc. The ingredients can be an essential oil, a carrier oil, a clay, a butter, a salt, etc. The ingredients can also include a mix agent such as a glycerin, beeswax, witch hazel extract, lecithin, gelatin, soy wax, aloe vera, etc. Based on the size of the product, the processor can determine the amounts of the various ingredients to include.

In step 710, based on the product, the processor can select a predetermined set of actions to be performed by multiple articulated members including a robotic arm, a dispenser and a processing station. The predetermined set of actions can include an ordered sequence of actions and a variable input configured to receive the one or more ingredients. The predetermined set of actions can synchronize multiple actions performed by the robotic arm, the dispenser, and the processing station to produce the product. Some actions can be done in parallel, but some actions need to be done in the ordered sequence. Further, multiple products from one or more users can be in the pipeline at the same time. For example, one product could be in a refrigerator, while another product is at a whisking station.

In step 720, the articulated members can perform the predetermined set of actions. In step 730, the robotic arm can deliver the product to the user.

To facilitate the performance of the predetermined set of actions, in one embodiment, the processor can synchronize the ordered sequence of actions performed by the articulated members by completing an action assigned to a first articulated member among the articulated members and sending a signal to a second articulated member among the articulated members to perform a subsequent action. In addition to the signal, or instead of the signal, a sensor associated with the second articulated member can sense that the first articulated member is stationary and in a proximity to the second articulated member in the multiple articulated members. The second articulated member can receive a second action in the predetermined set of actions, where the second action is guarded by a precondition that the first articulated member complete a first action. The second articulated member can perform the second action.

For example, the first articulated member can be robotic arm and the second articulated member can be the whisking station. The first action can be an instruction to the robotic arm to deliver a container to the whisking station. The second action can be an instruction to the whisking station to whisk the contents of the container. The precondition guarding the second action can be a requirement that the robotic arm complete the first action, namely, to deliver the container to the whisking station.

To facilitate the performance of the predetermined action, the processor can receive an indication from the first articulated member that the first action has been completed by the first articulated members. For example, the robotic arm can send a message to the processor indicating that the robotic arm has delivered the contents of the container to a boiling station. The processor can determine a second action in the ordered sequence of actions and a second articulated member associated with the second action, where the second action is subsequent to the first action. For example, the second action can be an instruction for the boiling station to heat the contents of the container. The processor can send a signal to the second articulated member to perform the second action. For example, the processor can instruct the boiling station to heat the contents of the container.

As described in this application, the predetermined set of actions depends on the type of product selected. The product selected can be a hair care product or a body wash. The hair care product can include a shampoo, conditioner, hair moisturizer, etc. Some of the predetermined sets of actions are described below.

When the product selected is a hair care product or a body wash, the robotic arm can grab a first container and can position the first container to obtain from the dispenser the one or more ingredients specified by the user. When at least one of the one or more ingredients is a solid, the robotic arm can transport the solid ingredient to a boiling station to be boiled for approximately 30 seconds. After the boiling, the robotic arm can obtain the oils, which do not need to be boiled, and can transport the ingredients to a mixing station, which can mix the ingredients for approximately 30 seconds. The robotic arm can transport the mixed ingredients to a container storage station. The robotic arm can obtain a second container from the container storage station. The robotic arm can obtain and flip the container as shown in FIGS. 5A-5B. The robotic arm can pour the mixture into the second container and deliver the second container to a delivery station for the user to pick up. The robotic arm can deliver the first container to a cleaning station, where the first container can be cleaned for approximately 10 seconds.

The product selected can be a body butter, in which case at least one of the ingredients is a butter that needs to be boiled. The robotic arm can grab a first container and obtain from the dispenser the one or more ingredients including the butter into the first container. The robotic arm can transport the first container to the boiling station. The boiling station can boil the one or more ingredients. After the boiling, the robotic arm can transport the first container contained in the boiled butter to the dispenser to add oils selected by the user. The robotic arm can transport the first container with ingredients to a whisking station to be whisked for approximately 1 minute. The robotic arm can transport the whisked ingredients to a container storage station, where the robotic arm can obtain a second container. The robotic arm can pour the whisked ingredients into the second container and deliver the second container to a delivery station for the user to pick up. The robotic arm can transport the first container to the cleaning station, where the first container can be cleaned for approximately 10 seconds before the container is ready for subsequent use.

The product selected can be a scrub, such as a face scrub or a body scrub. The robotic arm can grab the first container and can obtain from the dispenser the selected butters and mix agents into the first container. The robotic arm can transport the first container to the boiling station. The boiling station can boil the one or more ingredients for approximately 30 seconds. The robotic arm can transfer the first container back to the dispenser to obtain an oil, a sugar and/or a salt. The robotic arm can transport the first container to the mixing station to be mixed and/or blended together for approximately one minute. The robotic arm can transfer the mixture to the container storage station and obtain a second container, for example by flipping the second container right side up. The robotic arm can pour the mixture from the first container into the second container and deliver the second container to the delivery station for user pickup. The robotic arm can transport the first container to the cleaning station, where the first container can be cleaned for approximately 10 seconds before the container is ready for subsequent use.

The product selected can be a shaving cream. The robotic arm can obtain the first container and can obtain from the dispenser a butter to put into the first container. The robotic arm can transport the first container to the boiling station, where the butter is boiled for approximately 30 seconds and turned into a liquid. The robotic arm can transport the first container to a refrigerator, where the container and the ingredients are cooled for a predetermined amount of time to obtain hardened ingredients. The predetermined amount of time can be approximately three minutes. The robotic arm can transport the hardened ingredients to a whipping station, where the hardened ingredients are whipped for approximately one minute, until a consistency of a frosting is obtained. The robotic arm can deliver the frosting to the user by transporting the frosting to a container storage station, obtaining a second container from the container storage station, pouring the frosting into the second container, and delivering the second container to a delivery station. The robotic arm can transport the first container to the cleaning station, where the first container can be cleaned for approximately 10 seconds before the container is ready for subsequent use.

Most products take two minutes to create from the moment the system receives the order until the system delivers the product. If the production time is longer than two minutes, the longer production time can be highlighted in the user interface 200, 205 in FIGS. 2A-2B.

Computer

Figure 8:
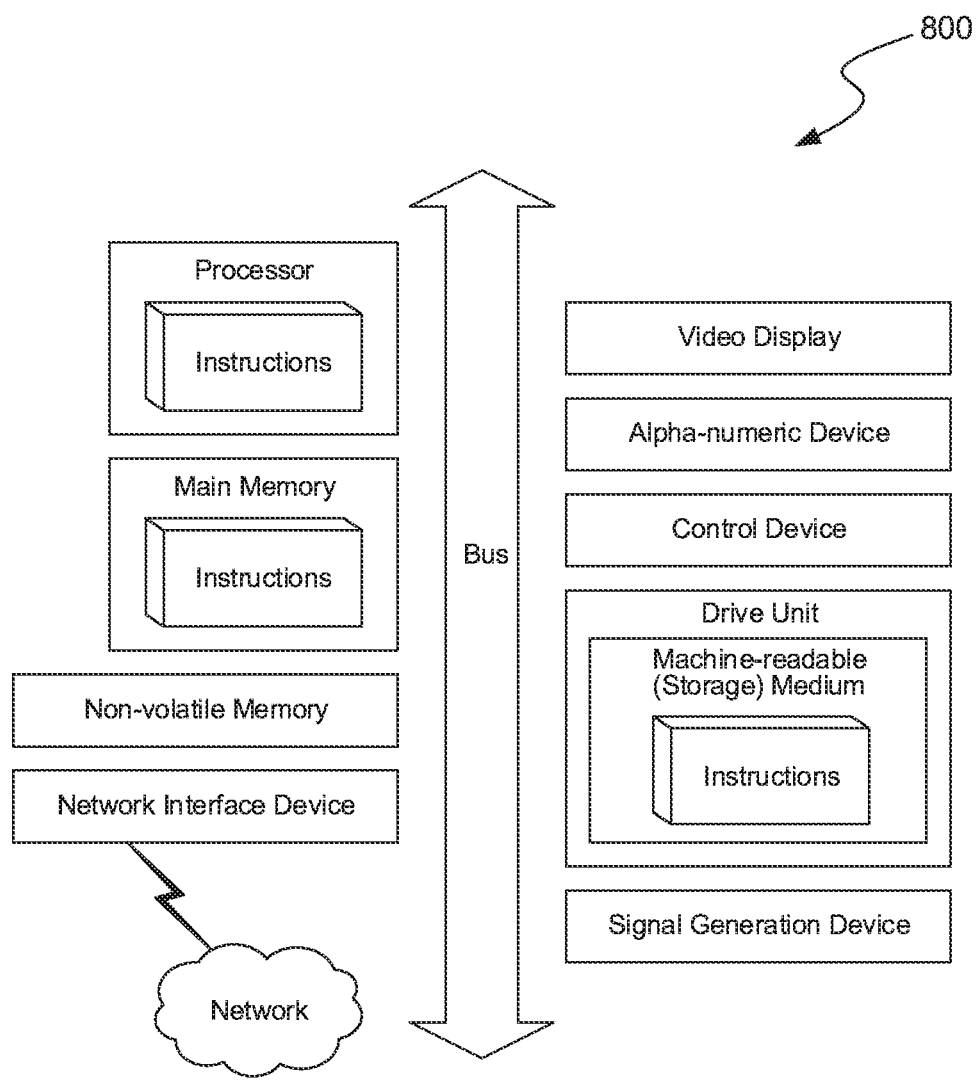
FIG. 8 is a diagrammatic representation of a machine in the example form of a computer system within which a set of instructions for causing the machine to perform any one or more of the methodologies or modules discussed herein may be executed.

FIG. 8 is a diagrammatic representation of a machine in the example form of a computer system 800 within which a set of instructions, for causing the machine to perform any one or more of the methodologies or modules discussed herein, may be executed.

In the example of FIG. 8, the computer system 800 includes a processor, memory, non-volatile memory, and an interface device. Various common components (e.g., cache memory) are omitted for illustrative simplicity. The computer system 800 is intended to illustrate a hardware device on which any of the components described in the example of FIGS. 1-7 (and any other components described in this specification) can be implemented. The computer system 800 can be of any applicable known or convenient type. The components of the computer system 800 can be coupled together via a bus or through some other known or convenient device.

The processor of computer system 800 can be the processor 310 in FIG. 3 synchronizing actions of the robotic arm, the dispenser, the processing stations, the delivery station, and/or the cleaning station. The network interface device of the computer system 800 can be used for communication between the robotic arm, dispenser, the processing stations, the delivery station and/or the cleaning station. The processor of the computer system 800 can be a microcontroller associated with individual elements of the system such as the robotic arm, the dispenser, the processing station, the delivery station, or the cleaning station. The processor of the computer system 800 can be the processor associated with the device receiving the user input. The video display can be the display showing the user interfaces described in FIGS. 2A-2B. The main memory, nonvolatile memory, and/or the drive unit can store the predetermined scenarios to be executed by the various elements of the system such as the robotic arm, the dispenser, the processing station, the delivery station, and/or the cleaning station.

This disclosure contemplates the computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 800. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Wash., and its associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A system to create a custom personal care product, the system comprising:
   a plurality of dispensers containing a plurality of ingredients, wherein a combination of the plurality of ingredients is combinable to form the personal care product, and wherein at least one of the plurality of ingredients contained in the plurality of dispensers is a cosmetic-safe ingredient;

a computer processor configured to receive a user input indicating the custom personal care product and one or more selected ingredients contained in the plurality of dispensers associated with the custom personal care product, and to translate the user input into a plurality of actions to be performed by a robot and a plurality of processing stations;

a dispenser of the plurality of dispensers to dispense the one or more selected ingredients;

the robot comprising a joint and a gripping member rotatably coupled to the joint, the gripping member to hold a container and to position the container to receive the one or more selected ingredients from the dispenser, the robot to deliver the one or more selected ingredients to a processing station in the plurality of processing stations; and the plurality of processing stations arranged around the robot, the plurality of processing stations comprising:
a boiling station to warm the container;
a mixing station to mix the one or more selected ingredients;
a whisking station to whisk the one or more selected ingredients;
a refrigerator to cool the one or more selected ingredients; and
a cleaning station to clean the container of the one or more selected ingredients.

2. The system of claim 1, comprising:
the computer processor, based on the custom personal care product, to select a predetermined scenario from a plurality of predetermined scenarios to be performed by the robot, the dispenser, and the processing station, wherein the plurality of predetermined scenarios can be modified by the user input.

3. The system of claim 1, comprising:
the container comprising a grip slot enabling the gripping member of the robot to hold the container.

4. A system for producing a personal care product, comprising:
a plurality of dispensers containing a plurality of ingredients,
wherein a combination of the plurality of ingredients is combinable to form the personal care product, and wherein at least one of the plurality of ingredients contained in a dispenser of the plurality of dispensers is a cosmetic-safe ingredient;
a processor configured to receive an input from a user comprising the personal care product and one or more selected ingredients contained in the plurality of dispensers, and based on the personal care product select a predetermined set of actions to be performed by an automatically-operated member, the plurality of dispensers, and a processing station,
the automatically-operated member comprising a first joint and a gripping member movably coupled to the first joint, the gripping member to hold a container and to position the container to receive the one or more selected ingredients from the plurality of dispensers, the automatically-operated member to deliver the one or more selected ingredients to the processing station;
the processing station upon receiving the one or more selected ingredients to process the one or more selected ingredients to produce the personal care product, the processing station including a whisking station; and
the automatically-operated member to retrieve the personal care product and to deliver the personal care product to a delivery station.

5. The system of claim 4, comprising:
a computer processor to receive a user input indicating a desired personal care product and the one or more selected ingredients associated with the desired personal care product, and to translate the user input into a plurality of actions to be performed by the automatically-operated member.

6. The system of claim 5, comprising:
the computer processor, based on the desired personal care product, to select a predetermined scenario from a plurality of predetermined scenarios to be performed by the automatically-operated member, the dispenser, and the processing station, wherein the plurality of predetermined scenarios can be modified by the user input.

7. The system of claim 4, comprising:
the container comprising a grip slot enabling the gripping member of the automatically-operated member to hold the container.

8. The system of claim 7, the grip slot comprising a first magnet, the gripping member comprising a second magnet attracted to the first magnet.

9. The system of claim 4, the automatically-operated member comprising a second joint rotatably coupled to the first joint and the gripping member, the second joint to rotate the first joint and the gripping member between the dispenser, the processing station and the delivery station.

10. The system of claim 4, the dispenser, the processing station and the delivery station arranged in a substantially circular path around the automatically-operated member.

11. The system of claim 4, the processing station comprising a mixing station configured to blend or stir the one or more selected ingredients.

12. The system of claim 4, the processing station comprising a multipurpose station comprising a plurality of switchable members, wherein a switchable member in the plurality of switchable members is configured to blend, whisk, or stir the one or more selected ingredients.

13. The system of claim 4, comprising:
the processing station comprising a first sensor to detect a proximity of the automatically-operated member, and upon detecting the proximity of the automatically-operated member to process the one or more selected ingredients; and
the dispenser comprising a second sensor to detect the proximity of the automatically-operated member, and upon detecting the proximity of the automatically-operated member to dispense the one or more selected ingredients.

14. The system of claim 4, the processing station comprising a temperature control station or a washing station.

15. A method comprising:
receiving an input from a user comprising a personal care product and one or more ingredients to include in the personal care product,
wherein the one or more ingredients are included in a plurality of dispensers, wherein a combination of a plurality of the one or more ingredients is combinable to form the personal care product, and wherein at least one of the one or more ingredients contained in a dispenser of the plurality of dispensers is a cosmetic-safe ingredient;

based on the personal care product, selecting a predetermined set of actions to be performed by a plurality of articulated members comprising an automatically-operated member, the plurality of dispensers, and a processing station that includes a whisking station, the predetermined set of actions comprising an ordered sequence of actions and a variable input configured to receive the one or more ingredients, wherein the automatically-operated member comprises a first joint and a gripping member movably coupled to the first joint, the gripping member to hold a container and to position the container to receive the one or more ingredients from the plurality of dispensers, the automatically-operated member to deliver the one or more ingredients to the processing station; and performing the predetermined set of actions, including:

receiving, by the processing station, the one or more ingredients to process the one or more ingredients to produce the personal care product;

retrieving, by the automatically-operated member, the personal care product; and delivering the personal care product to a delivery station.

16. The method of claim 15, said performing the predetermined set of actions comprising:

synchronizing the ordered sequence of actions performed by the plurality of articulated members by completing an action assigned to a first articulated member in the plurality of articulated members and sending a signal to a second articulated member in the plurality of articulated members to perform a subsequent action.

17. The method of claim 15, comprising:

sensing that a first articulated member in the plurality of articulated members is stationary in a proximity to a second articulated member in the plurality of articulated members;

receiving by the second articulated member a second action in the predetermined set of actions, the second action guarded by a precondition that the first articulated member completed a first action; and performing the second action.

18. The method of claim 15, comprising:

receiving an indication from a first articulated member in the plurality of articulated members that a first action has been completed by the first articulated member;

determining a second action in the ordered sequence of actions and a second articulated member associated with the second action, wherein the second action is subsequent to the first action; and sending a signal to the second articulated member to perform the second action.

19. The method of claim 15, the processing station comprising a boiling station and a mixing station, the method comprising:

grabbing, by the automatically-operated member, a first container;

obtaining from the plurality of dispensers the one or more ingredients into the first container;

when at least one of the one or more ingredients is a solid ingredient, transporting, by the automatically-operated member, the solid ingredient to the boiling station;

transporting, by the automatically-operated member, the one or more ingredients to the mixing station;

mixing the one or more ingredients by the mixing station to obtain a mixture;

transporting, by the automatically-operated member, the mixture to a container storage station;

obtaining a second container from the container storage station;

pouring, by the automatically-operated member, the mixture into the second container;

delivering the second container to the delivery station for the user to pick up; and cleaning the first container.

20. The method of claim 15, the processing station comprising a boiling station, the method comprising:

grabbing, by the automatically-operated member, a first container;

obtaining from the plurality of dispensers the one or more ingredients including a butter into the first container;

transporting, by the automatically-operated member, the first container to the boiling station;

boiling, by the boiling station, the one or more ingredients to obtain a melt;

obtaining from the plurality of dispensers the one or more ingredients excluding the butter into the first container by transporting, by the automatically-operated member, the melt to the plurality of dispensers and releasing from the plurality of dispensers the one or more ingredients excluding the butter to obtain full ingredients;

whisking the full ingredients by transporting, by the automatically-operated member, the full ingredients to the whisking station and whisking the full ingredients to obtain whisked ingredients;

transporting, by the automatically-operated member, the whisked ingredients to a container storage station;

obtaining a second container from the container storage station;

pouring, by the automatically-operated member, the whisked ingredients into the second container;

delivering the second container to the delivery station for the user to pick up; and cleaning the first container.

21. The method of claim 15, the processing station comprising a boiling station and a mixing station, the method comprising:

grabbing, by the automatically-operated member, a first container;

obtaining from the plurality of dispensers the one or more ingredients including a butter into the first container;

transporting, by the automatically-operated member, the first container to the boiling station;

boiling, by the boiling station, the one or more ingredients to obtain a melt;

obtaining from the plurality of dispensers the one or more ingredients including an oil, a sugar, or a salt into the first container by transporting, by the automatically-operated member, the melt to the plurality of dispensers and releasing from the plurality of dispensers the one or more ingredients including the oil, the sugar or the salt to obtain full ingredients;

mixing the full ingredients by transporting, by the automatically-operated member, the full ingredients to the mixing station and whisking the full ingredients to obtain mixed ingredients;

delivering the mixed ingredients to the user by transporting, by the automatically-operated member, the mixed ingredients to a container storage station, obtaining a second container from the container storage station, pouring, by the automatically-operated member, the mixed ingredients into the second container, and delivering the second container to the delivery station; and cleaning the first container.

22. The method of claim 15, the processing station comprising a boiling station, a refrigerator and a whipping station, the method comprising:
- grabbing, by the automatically-operated member, a first container;
- obtaining from the plurality of dispensers the one or more ingredients including a butter into the first container;
- transporting, by the automatically-operated member, the first container to the boiling station;
- boiling, by the boiling station, the one or more ingredients to obtain a melt;
- transporting, by the automatically-operated member, the melt to the refrigerator for a predetermined amount of time to obtain hardened ingredients;
- whipping the hardened ingredients by transporting, by the automatically-operated member, the hardened ingredients to the whipping station and whipping the hardened ingredients to obtain a frosting;
- delivering the frosting to the user by transporting, by the automatically-operated member, the frosting to a container storage station, obtaining a second container from the container storage station, pouring, by the automatically-operated member, the frosting into the second container, and delivering the second container to the delivery station; and cleaning the first container.

* * * * *